United States Patent
Takimoto et al.

(10) Patent No.: US 6,828,764 B2
(45) Date of Patent: *Dec. 7, 2004

(54) REGULATOR CIRCUIT AND CONTROL METHOD THEREOF

(75) Inventors: Kyuichi Takimoto, Kasugai (JP); Yoshihiro Nagaya, Kasugai (JP); Toshiyuki Matsuyama, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 70 days.

This patent is subject to a terminal disclaimer.

(21) Appl. No.: 10/101,976

(22) Filed: Mar. 21, 2002

(65) Prior Publication Data

US 2003/0067283 A1 Apr. 10, 2003

(30) Foreign Application Priority Data

Oct. 5, 2001 (JP) ........................................ 2001-310088

(51) Int. Cl.⁷ .............................. G05F 1/40; G05F 1/44
(52) U.S. Cl. ...................... 323/284; 323/274; 320/128; 320/140
(58) Field of Search ................................ 323/284, 282, 323/274; 320/128, 140

(56) References Cited

U.S. PATENT DOCUMENTS

| | | | | |
|---|---|---|---|---|
| 5,396,163 A | * | 3/1995 | Nor et al. ................... | 320/159 |
| 6,337,563 B2 | * | 1/2002 | Takimoto et al. ........... | 323/284 |
| 6,366,070 B1 | * | 4/2002 | Cooke et al. ................ | 323/284 |
| 6,437,549 B1 | * | 8/2002 | Takagishi .................... | 323/282 |
| 6,452,368 B1 | * | 9/2002 | Basso et al. ................. | 323/282 |
| 6,456,051 B2 | * | 9/2002 | Darzy ........................ | 323/284 |

* cited by examiner

*Primary Examiner*—Bao Q. Vu
(74) *Attorney, Agent, or Firm*—Arent Fox PLLC

(57) ABSTRACT

A regulator circuit capable of accurately adjusting output voltage anywhere in a current region and maintaining optimum output voltage by correcting setting of a predetermined voltage to be regulated depending on a value of charging current. An output terminal of an amplifier is connected to a reference voltage terminal through a resistance element. When charging current does not flow, detection voltage 0V. Consequently, voltage of a reference power source is divided between a resistance element R1 and parallel resistance elements R2 and R3. When charging current flows and detection voltage is outputted, the detection voltage is divided by resistance elements R2 and R3, whereby corrected voltage depending on a value of charging current is generated. Even if voltage drop occurs between a charging-control-device output terminal and a battery terminal, control voltage of output voltage is appropriately adjusted so that a battery terminal can keep full charging voltage.

22 Claims, 13 Drawing Sheets

REGULATOR CIRCUIT (CHARGING CONTROL DEVICE) DIRECTED TO FIRST EMBODIMENT

FIG.1 REGULATOR CIRCUIT (CHARGING CONTROL DEVICE) DIRECTED TO FIRST EMBODIMENT

REFERENCE VOLTAGE SETTING CIRCUIT DIRECTED TO FIRST EMBODIMENT

CHARGING CURRENT DETECTION CHARACTERISTICS

CHARGING CURRENT CHARACTERISTICS WITH RESPECT TO REFERENCE VOLTAGE OF FIRST EMBODIMENT $$\left( \begin{array}{l} VFB0 = \dfrac{R120}{R110+R120} \times VBAT0 \\[6pt] \Delta V2 = \dfrac{R120}{R110+R120} \times \Delta VLS = \dfrac{R120}{R110+R120} \times RLS1 \times ICHGM \end{array} \right)$$

BATTERY CHARGING CHARACTERISTICS DIRECTED TO FIRST THROUGH THIRD EMBODIMENT $$\Delta VLS = \frac{R110+R120}{R120} \times \Delta V2$$

$$VBAT0 = \frac{R110+R120}{R120} \times VFB0$$

FIG.6 REGULATOR CIRCUIT (CHARGING CONTROL DEVICE) DIRECTED TO SECOND EMBODIMENT

AMPLIFIER DIRECTED TO SECOND EMBODIMENT

FIG.8 REGULATOR CIRCUIT (CHARGING CONTROL DEVICE) DIRECTED TO THIRD EMBODIMENT

CHARGING CURRENT CHARACTERISTICS WITH RESPECT TO REFERENCE VOLTAGE OF THIRD EMBODIMENT

FIG.10 REGULATOR CIRCUIT (SWITCHING REGULATOR) DIRECTED TO FOURTH EMBODIMENT

FIG.11 REGULATOR CIRCUIT (SERIES REGULATOR) DIRECTED TO FIFTH EMBODIMENT

FIG.12 SPECIFIC EXAMPLE OF AMPLIFIER

REGULATOR CIRCUIT (CHARGING CONTROL DEVICE) DIRECTED TO RELATED ART

BATTERY CHARGING CHARACTERISTICS DIRECTED TO RELATED ART

REGULATOR CIRCUIT AND CONTROL METHOD THEREOF

BACKGROUND OF THE INVENTION

1. Field of the Invention

The present invention relates to a regulator circuit for adjusting an output voltage to predetermined DC voltage and maintaining thereat. More specifically, it relates to a DC regulator circuit for charging a battery which is to be connected to an output terminal and for applying predetermined DC voltage to a load.

2. Description of Related Art

MPU, LSI, IC used in various electric appliances, other semiconductor devices, drive motors such as HDD, FDD, and the like work using DC voltages of DC 5V, 3.3V and the like as their power source. Therefore, electric appliances as such need a DC/DC converter for converting a current voltage converted from AC 100V or the like via an AC adapter into a desirable current voltage value. Furthermore, as system gets further complicated, there may be some cases that various kinds of power source system may be needed and that an output voltage from a DC/DC converter is further converted by another DC/DC converter. Taking conversion voltage difference, required power source capacity and accuracy, and the like into consideration, these DC/DC converters are constituted by switching regulators or series regulators, in general.

In recent years, there have been some cases that, instead of an AC adapter, rechargeable batteries as DC power source are used for portable electric appliances such as note-type personal computers and cellular phones. In the above system, an electric appliance is connected to an AC adapter and the like for recharging operation. For controlling flow of charging current to a battery, battery voltage in a fully charged state and the like, a charging control device is provided for the portable electric appliances.

FIG. 13 shows a conventional charging control device 100. In the charging control device 100, switching control of a PMOS driver Tr1 is conducted. Thereby, a coil L1 and a capacitor C1 smooth out DC voltage outputted from an AC adapter 102 and the smoothed DC voltage is charged to a battery 101 via a charging current detecting resistance RS1. A diode D1 is a fly-back diode for regenerating charging current ICHG.

Switching control of the PMOS driver Tr1 is conducted by a charging control circuit 111. An amplifier 112 amplifies terminal voltage of the charging current detecting resistance RS1. An error amplifier 116 amplifies voltage difference between reference voltage V1 and the amplified terminal voltage of the charging current detecting resistance RS1 as error amplification, as well as outputs control voltage for constant current charging. Furthermore, resistance elements R110 and R120 divide output voltage VO at a charging-control-device output terminal VO that is a battery-side terminal of the charging current detecting resistance RS1. An error amplifier 118 amplifies electrical potential difference between reference voltage V2 at a reference-voltage terminal V2 and the divided voltage of the output voltage VO as error amplification, as well as outputs control voltage for constant voltage charging. The above two kinds of control voltage are inputted to a comparator 120 and compared with an oscillating signal from an oscillator (OSC) 122 there. Thereby, a switching duty is determined. In case control voltage for constant current charging derived from the error amplifier 116 determines a switching duty, constant current charging is controlled and charging current ICHG for the battery 101 is adjusted to a predetermined value of charging current ICHGM. In case control voltage for constant voltage charging derived from the error amplifier 118 determines a switching duty, constant voltage charging is controlled and the output voltage VO is kept at a predetermined value of full charging voltage VBAT0 so as to carry out charging.

According to a charging control method of the charging control circuit 111 shown in FIG. 13, the error amplifier 116 controls charging current ICHG for the battery 101 until charging begins and a value of output voltage VO at the charging-control-device output terminal VO reaches full charging voltage VBAT0. Thereby, charging is carried out rapidly with a predetermined value of charging current ICHGM. When charging to the battery 101 further goes on and the output voltage VO at the charging-control-device output terminal VO reaches full charging voltage VBAT0, a value of control voltage for constant current charging outputted from the error amplifier 116 and that for constant voltage charging from the error amplifier 118 reverse. As a result, charging control is switched from constant current control to constant voltage control. Charging operation further goes on with the output voltage VO at the charging-control-device output terminal VO kept at full charging voltage VBAT0. Charging to the battery 101 completes when the charging current ICHG decreases from its predetermined charging current ICHGM and finally runs out.

Since the charging control device 100 and the battery 101 are connected via connectors, switches and the like, there are resistance elements such as contact resistances and the like at connecting portions of the connectors and the like. A wiring resistance of connection wiring itself is also arranged together with the contact resistance at a connecting portion and a parasitic resistance RLS1 is inserted at a connecting path. Since charging current ICHG flows in the battery 101 through the parasitic resistance RLS1, voltage drop $\Delta$VLS occurs when charging current ICHGM in a constant current control state flows. As a result, battery terminal voltage VBAT lowers by the voltage drop $\Delta$VLS, compared with output voltage VO at the charging-control-device output terminal VO. The charging control device 100 carries out constant voltage control with respect to output voltage VO at the charging-control-device output terminal VO. Therefore, as constant current charging control further goes on and battery terminal voltage VBAT gets higher, output voltage VO at the charging-control-device output terminal VO gets higher. And then, at a point where the charging-control-device output terminal VO reaches full charging voltage VBAT0, output charging control is switched from constant current control to constant voltage control.

However, the battery terminal voltage VBAT does not reach full charging voltage VBAT0 of the battery 101 at this point but is charged up to voltage level lowered by voltage drop $\Delta$VLS from the full charging voltage VBAT0. That is, constant charging control is supposed to conduct high-speed charging control primarily, however, the voltage drop $\Delta$VLS due to the parasitic resistance RLS1 shortens constant charging control time. Along with that, it takes long to fully charge the battery 101, which is problematic.

FIG. 14 shows the battery charging characteristics of the conventional regulator circuit 100. In the regulator circuit 100, charging current ICHGM flows to the parasitic resistance RLS1 during the constant current control period. Thereby, output voltage VO of the charging-control-device output terminal VO has a voltage value higher by the voltage drop $\Delta$VLS compared with battery terminal voltage VBAT.

Consequently, before the battery terminal voltage VBAT reaches a value of predetermined voltage VBAT0 in a full-charging condition, the charging control manner is switched from constant current charging control to constant voltage charging control. As a result, a constant current charging control period gets shorter than original one. Subsequent charging control is made in accordance with constant voltage charging control and the battery terminal voltage VBAT is further charged by the drop voltage $\Delta$VLS. However, the constant voltage charging control is conducted in a manner that charging-control-device output terminal VO which has already reached full charging voltage VBAT0 is kept at voltage VBAT0. Therefore, a switching duty of the PMOS driver Tr1 must be lowered inevitably. Accordingly, the charging current ICHG of the related art lowers in a short charging period compared with ideal charging current ICGH_I. Consequently, the battery voltage VBAT takes a long charging time to reach full charging voltage VBAT0 compared with ideal battery voltage VBAT_I. That is, there is required a full charging time tx longer than a full charging time t0 taken in case original constant current charging control is conducted.

Furthermore, it is possible to avoid influence of voltage drop $\Delta$VLS due to the above-mentioned parasitic resistance RLS1 by a manner such that full charging voltage under a constant voltage control condition is set to a sum of full charging voltage VBAT0, suitable to a specification of the battery 101, and voltage corresponding to voltage drop $\Delta$VLS. However, in this case, battery terminal voltage VBAT in a full charging condition gets higher than the voltage suitable to the specification of the battery 101. This causes huge voltage stress to the battery 101 and affects battery performance, which is problematic.

Furthermore, constant current control may be utilized for current limiting control so that the charging control circuit 111 can be used as a regulator circuit for supplying constant voltage to loads. Even in this case, a parasitic resistance RLS exists between the output terminal VO and a load. Therefore, voltage applied to the load lowers by drop voltage $\Delta$VLS from a predetermined voltage in a large load current region reaching an over-loaded state. This makes it impossible to apply predetermined voltage to a load accurately in the entire load current region, which is problematic.

SUMMARY OF THE INVENTION

The present invention, attempted to resolve the above-noted problems with the prior art, is intended to provide a regulator circuit capable of accurately adjusting and maintaining output voltage in any points of charging current region and load current region by correcting setting of predetermined voltage to be regulated depending on values of charging current and load current.

In order to achieve the above-stated object, there is provided a regulator circuit directed to one aspect of the present invention comprising: an output voltage control section for controlling output voltage based on reference voltage; an output current detecting section; and a reference voltage correcting section for controlling the reference voltage based on output current detected at the output current detecting section.

In the regulator circuit directed to the one aspect of the present invention, the output voltage control section controls output voltage using reference voltage controlled by the reference voltage correcting section, based on output current detected at the output current detecting section.

Thereby, output current flows through a parasitic load element on a current path. Even if voltage values of output voltages on the current path, potential values of which should be equal essentially, are not same, the reference voltage correcting section controls a value of the reference voltage depending on a value of the output current. Accordingly, output voltage at a predetermined position on the current path can be adjusted appropriately. Even if there is a distance between a position where the output voltage control section should control output voltage depending on a value of the reference voltage and a position from which a controlled output voltage is desired to be taken, on the current path, a desired value of output voltage can be obtained.

Furthermore, the regulator circuit directed to the one aspect of the present invention may further include an output current control section for controlling output current based on a detection result obtained by the output current detecting section. Thereby, output voltage can be controlled depending on a value of the output current and the output current can be controlled, as well.

There is provided a regulator circuit controlling method of making reference voltage variable which is directed to the one aspect of the present invention, the reference voltage adjusting output voltage to predetermined voltage and maintaining thereat depending on a value of output current.

Thereby, output current flows through a parasitic load element on a current path. Even if voltage values of output voltages on the current path, potential values of which should be equal essentially, are not same, the reference voltage can be variable depending on a value of the output current. Accordingly, output voltage at a predetermined position on the current path can be adjusted appropriately and kept at an appropriate value. Even if there is a distance between a position where the output voltage control section should control output voltage depending on a value of the reference voltage and a position from which a controlled output voltage is desired to be taken, on the current path, a desired value of output voltage can be obtained.

The above and further objects and novel features of the invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

First through fifth embodiments will describe regulator circuits of the present invention referring to FIG. 1 through FIG. 12.

Figure 1:
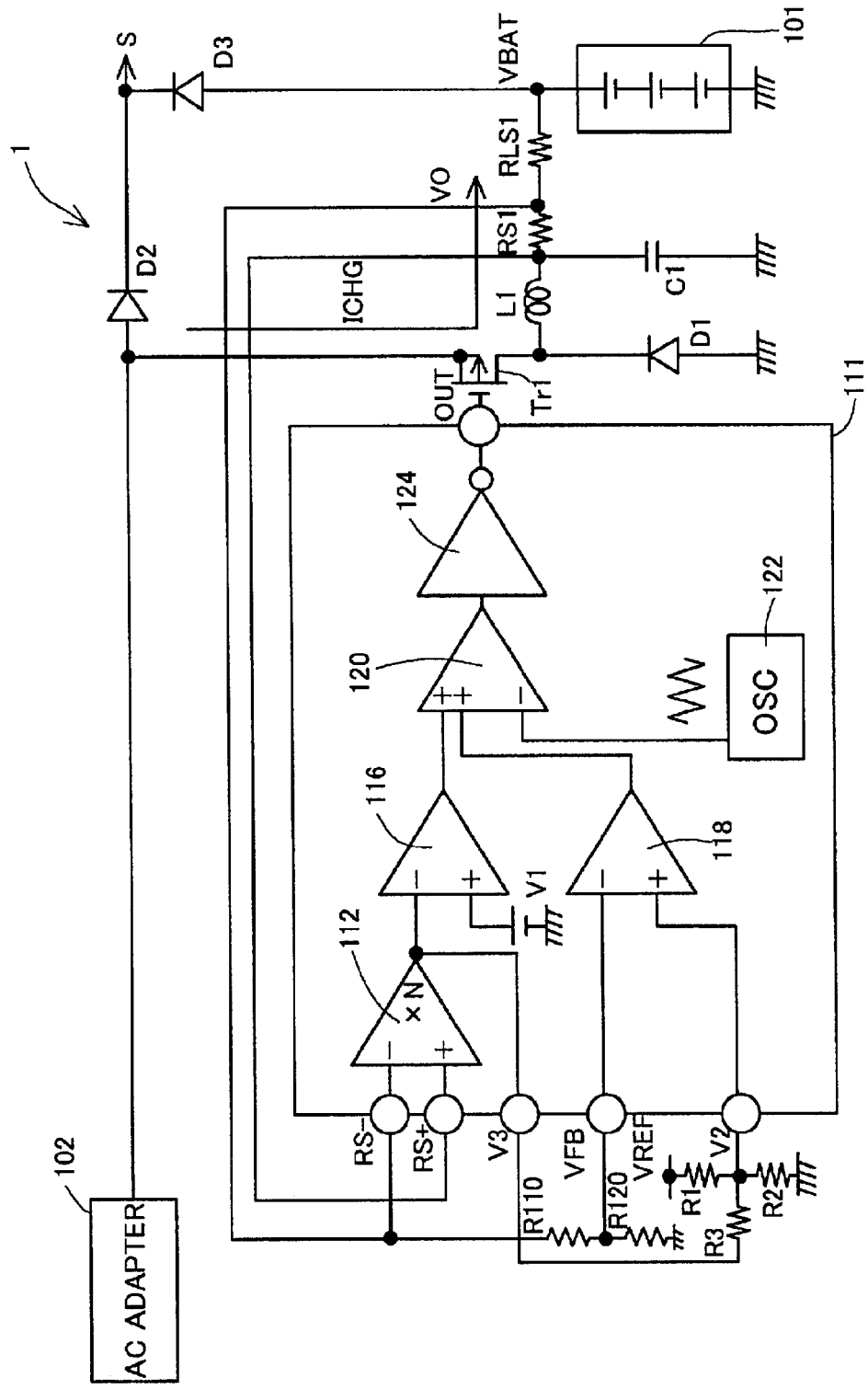
FIG. 1 shows a circuit block of a regulator circuit (charging control device) directed to a first embodiment.

A first embodiment corresponding to FIG. 1 shows a charging control circuit 1 as regulator circuit of the present invention. More specifically, FIG. 1 shows a power source portion of an electric appliance such as a portable electric appliance. The electric appliance receives DC voltage from an AC adapter through a diode D2 as well as DC voltage VBAT from a battery 101 through a diode D3. In the typical voltage supply system such as the above, as shown in FIG. 1, higher output voltage between output voltage from the AC adapter or output voltage VBAT from the battery 101 is set to be supplied to the electric appliance. In case the AC adapter 102 is connected to the appliance, DC from the AC adapter 102 is supplied whereas in case the AC adapter is disconnected, DC voltage VBAT from the battery 101 is supplied. It is the charging control device 1 that controls amount of charging required for the battery 101 in the latter case.

A source terminal of a PMOS driver Tr1 is connected to an output terminal of the AC adapter 102, and a drain terminal of that is connected to one of the terminals of a coil L1 as well as to a cathode terminal of the diode D1. An anode terminal of the diode D1 is connected to ground potential, thereby to constitute a fly-back diode. Another terminal of the coil L1 is connected to a terminal of a capacitor C1, another terminal of which is connected to ground potential. Another terminal of the coil L1 is further connected to an output terminal VBAT of the battery 101 through a charging-current detecting resistance RS1. There are generally used a connector, switch, and the like so as to connect the appliance to the battery 101. Therefore, there exists a contact resistance or the like. Furthermore, there exists a wiring resistance due to connection wring. Taking these parasitic resistance elements into consideration, there is inserted a parasitic resistance RLS1 in the charging control device 1 shown in FIG. 1.

A charging control circuit 111 conducts switching control of the PMOS driver Tr1. Both terminals of the charging current detecting resistance RS1 are connected to output current detecting terminals RS− and RS+ of the charging control circuit 111. The output current detecting terminals RS− and RS+ are further connected to an inversion input terminal and a non-inversion input terminal of an amplifier 112, respectively. The charging current detecting resistance RS1 is connected to an inversion input terminal of an error amplifier 116. Further on, reference voltage V1 is inputted to a non-inversion input terminal of the error amplifier 116.

An output terminal V3 of the amplifier 112 is connected to reference voltage terminal V2 through a resistance element R3. It should be noted that a reference voltage terminal V2 is a terminal where a reference power source VREF is divided between resistance elements R1 and R2 in a meaning of electrical potential. The reference voltage terminal V2 is connected to a non-inversion input terminal of an error amplifier 118. An inversion input terminal of VFB of the error amplifier 118 is a terminal where a charging-control-device output terminal VO is divided between resistance elements R110 and R120 in a meaning of electrical potential. It is battery 101 side's terminal of the charging current detecting resistance RS1 that corresponds to the charging-control-device output terminal VO. A charging path leading to the battery 101 from the charging current detecting resistance RS1 differs depending on system. Since contents of contact resistances such as connector existing on the path and wiring resistances diversify, the charging control circuit 111 is designed to feedback and control output voltage VO of the charging control device output terminal VO.

The output terminals of the error amplifiers 116 and 118 are connected to two non-inversion input terminals of a comparator 120, respectively. An oscillating signal from an oscillator (OSC) 122 is inputted to an inversion terminal of the comparator 120. An output terminal of the comparator 120 is connected to an inversion output buffer 124. An output terminal OUT of the inversion output buffer 124 is connected to the gate terminal of the PMOS driver Tr1.

While the battery 101 is charged, the charging control circuit 111 controls amounts of charging current ICHG and reference voltage V2. The charging current ICHG is converted into voltage by the charging current detecting resistance RS1 on the charging path and the converted voltage is further inputted to output current detecting terminals RS− and RS+. Voltages inputted to the output current detecting terminals RS− and RS+ are inputted to an amplifier 112 and amplified up to a predetermined gain multiply (×N), thereby to obtain detection voltage V3 at an output terminal V3. The detection voltage V3 is inputted to the inversion input terminal of the error amplifier 116 and an error between the detection voltage V3 and reference voltage V1 inputted to the non-inversion input terminal is amplified there. Furthermore, output voltage VO detected at the charging-control-device output terminal VO is fedback, appropriately divided by resistance elements R110 and R120, and then, inputted to the inversion input terminal VFB of the error amplifier 118. Subsequently, an error amplification is made between the voltage inputted to the inversion input terminal VFB and the reference voltage V2 corresponding to reference power source inputted to the non-inversion input terminal V2 and appropriately divided by the resistance elements R1 and R2.

Output signals from the error amplifiers 116 and 118 are inputted to the two non-inversion terminals of the comparator 120 and compared with an oscillating signal from the oscillator (OSC) 122 which has been inputted to the inversion input terminal. Thereby, a switching duty of the PMOS driver Tr1 is determined. It should be noted that an oscillating signal is a periodically repeatable signal such as like chopping wave, saw-tooth-wave, and the like. Voltage level of an oscillating signal is compared with voltage levels of output signals from the error amplifiers 116 and 118, which are obtained by error amplification. The comparator 120 has two non-inversion input terminals and compares an oscillating signal inputted to the inversion input terminal and each of two signals, as resultant signals of error amplification, inputted to the two non-inversion input terminals. An internal element (not shown) originally installed in the comparator 120 selects and outputs either one of the two comparison result signals. In FIG. 1, a switching signal is outputted in case both two comparison result signals are ON-state. In other words, out of two signals inputted to the two non-inversion input terminals as driver, a comparative output is given to a signal with lower voltage level. That is, a signal with lower voltage level determines a switching duty. It is the PMOS transistor Tr1 that should be driven as a driver. Since the PMOS transistor Tr1 is driven when low-level voltage is applied to its gate terminal, the inversion output buffer 124 is provided as an output buffer.

Figure 2:
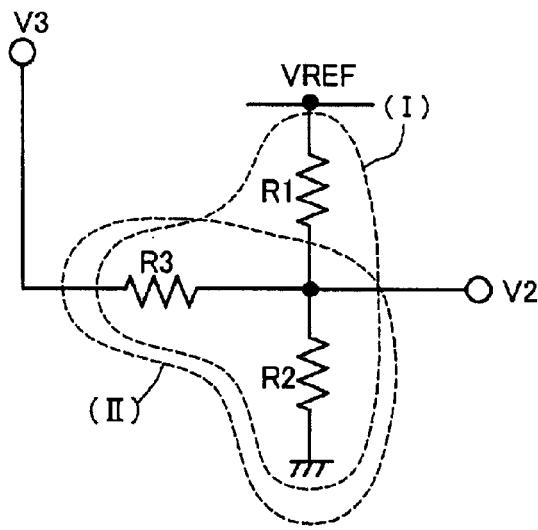
FIG. 2 is a circuit diagram showing a reference voltage setting circuit directed to the first embodiment.

FIG. 2 shows a reference voltage correcting section of the first embodiment. In case charging current ICHG does not flow and voltage drop ΔVLS does not occur to the parasitic resistance RLS1, detection voltage V3 is 0V at the reference voltage correcting section. As a result, voltage of the reference power source VREF is divided by the resistance element R1 and parallel resistances, namely, resistance elements R2 and R3. These resistance elements R2 and R3 connected in parallel substitute for the resistance element R102 directed to the related art. The resistance elements R1 through R3 correspond to a first voltage dividing section ((I) in FIG. 2) for controlling and adjusting output voltage VO of the charging-control-device output terminal VO to full charging voltage VBAT0. In case charging current ICHG flows and detection voltage V3 is outputted, the voltage value of detection voltage V3 is divided by resistance elements R3 and R2, thereby to generate correcting voltage depending on a current value of charging current ICHG. These resistance elements R2 and R3 correspond to a second voltage dividing section ((II) in FIG. 2).

In case reference voltage V2 is to be corrected in the reference voltage setting circuit shown in FIG. 2, resistance element R1 connected to the reference power source VREF and the resistance element R3 connected to detection voltage V3 are connected to the reference voltage terminal V2 in common and further connected to ground potential through the resistance element R2. Accordingly, this circuit network being interpreted in accordance with the Kirchhoff's law, the resistance elements R1 through R3 or predetermined gain (×N) of the amplifier 112 can be adjusted such that reference voltage V2 should be appropriately set to corrected voltage with respect to detection voltage V3 wherein a voltage value of reference voltage V2 obtained when charging current ICHG does not flow is made to coincide with a divided voltage value of full charging voltage VBAT0 obtained by dividing with the resistance elements R110 and R120. Dependency of reference voltage V2 with respect to detection voltage V3 (charging current ICHG) will be described later by referring to FIG. 4.

Figure 3:
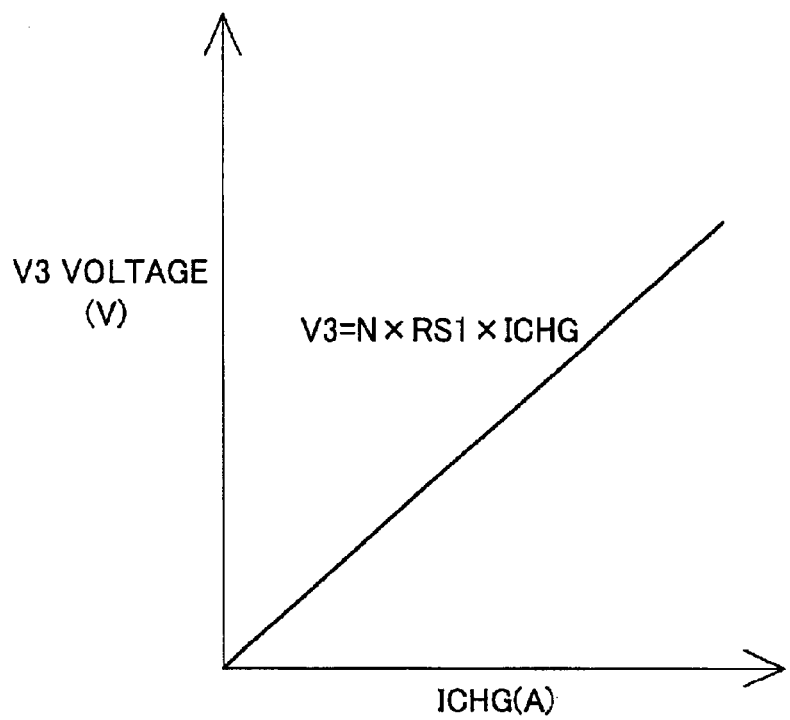
FIG. 3 shows charging current detection characteristics at an output current detecting section.

FIG. 3 shows detection characteristics of charging current ICHG detected by the charging-current detecting resistance RS1 and the amplifier 112. Flowing through the charging-current detecting resistance RS1, charging current ICHG to be charged in the battery 101 is converted into a voltage value (VRS1=RS1×ICHG) and then inputted to the output current detecting terminals RS− and RS+ of the amplifier 112. Since the amplifier 112 has a predetermined gain (×N), detection voltage V3 can be obtained such that an inputted voltage value (VRS1) is multiplied by the multiplier N. Relationship of detection voltage V3 with respect to charging current ICHG is:

$$V3 = N \times RS1 \times ICHG \qquad (1)$$

As shown in FIG. 3, the detection voltage V3 has a constant gradient (N×RS1) with respect to the charging current ICHG.

Figure 4:
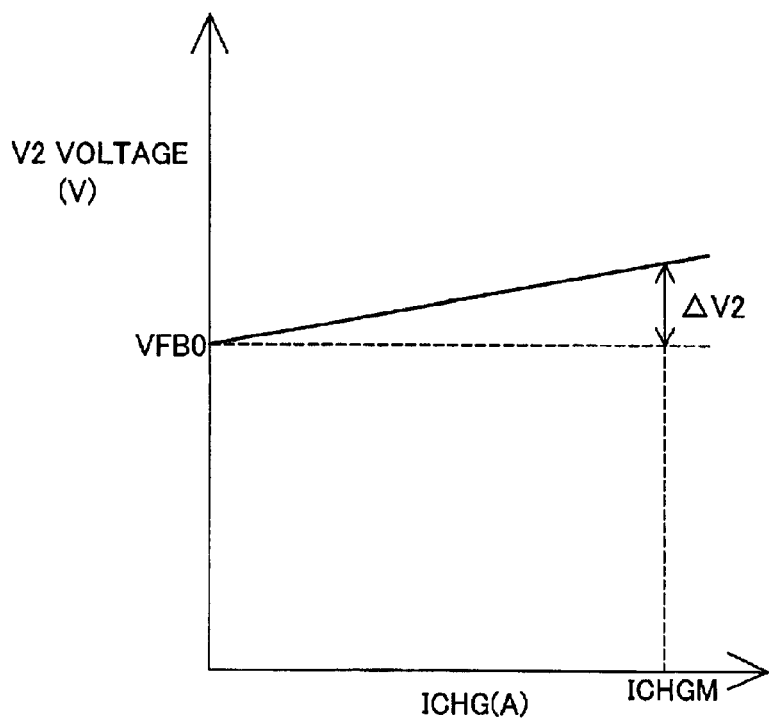
FIG. 4 shows charging current characteristics with respect to reference voltage of the first embodiment.

FIG. 4 shows characteristics of charging current ICHG with respect to reference voltage V2 outputted from the reference voltage correcting section shown in FIG. 2. The detection voltage V3 directed to FIG. 2 can be obtained by converting charging current ICHG into voltage in accordance with the charging-current detecting characteristics directed to FIG. 3. By applying the Kirchhoff's law to the circuit network of FIG. 2, an expression as below can be obtained.

$$V2 = R2 \times (VREF \times R3 + V3 \times R1)/((R3+R2) \times (R1+R2) - R2^2) \qquad (2)$$

In case charging current ICHG does not flow, detection voltage V3 is 0V according to FIG. 3. Therefore, in the reference voltage correcting section in FIG. 2, voltage of the reference power source VREF is divided by the resistance element R1 and the parallel resistances, namely, resistance elements R2 and R3, and outputted. This is led by the expression (2). When V3=0 is substituted in the expression (2), (3) as below can be obtained.

$$\begin{aligned} V2 &= R2 \times (VREF \times R3)/((R3+R2) \times (R1+R2) - R2^2) \qquad (3) \\ &= VREF \times (R2 \times R3)/(R3 \times R1 + R3 \times R2 + R2 \times R1) \\ &= VREF \times ((R2 \times R3)/(R2+R3))/ \\ &\quad (R1 + (R3 \times R2)/(R2+R3)) \\ &= VREF \times (R2 // R3)/(R1 + (R2 // R3)) \\ &= VFB0 \end{aligned}$$

It should be noted that R2//R3 indicates a resultant resistance obtained when the resistance elements R2 and R3 are connected in parallel to each other.

A voltage value VFB0 of the reference voltage v2 controls to set output voltage VO of charging-control-device output terminal VO to full charging voltage VBAT0. Accordingly, full charging voltage VBAT0 divided by the resistance elements R110 and R120 is applied to the inversion input terminal VFB of the error amplifier 118 at this stage. Since the divided voltage is controlled to coincide with reference voltage V2 (=VFB0), an expression as below can be obtained.

$$VFB0 = (R120/(R110+R120)) \times VBAT0 \qquad (4)$$

Let us apply specific numeric values to the expressions (3) and (4) as an example. Provided that VREF=5V, V2=4.2V are satisfied, equalities R1=10 kΩ, R2=210 kΩ, R3=70 kΩ are obtained. Here, reference voltage V2 (=VFB0) can be set as full charging voltage per cell in the battery 101, for example, and as to reference voltage V2, V2=4.2V can be conceived of a lithium-ion battery. In case the battery 101 has a structure such that three cells are arranged as a series, a resistance ratio between the resistance elements R110 and R120 shown below can be obtained from the expression (4).

$$R110/R120=2$$

In case charging current ICHG flows, a value of detection voltage V3 satisfies the expression (1). The followings describe a case that charging current ICHGM of a constant current charging period flows as charging current. Derived from the expression (1), the detection voltage V3 satisfies an expression (5) as below.

$$V3 = N \times RS1 \times ICHGM \qquad (5)$$

The expression (5) being substituted in the expression (2), an expression (6) as below can be obtained.

$$V2 = R2 \times (VREF \times R3 + N \times RS1 \times ICHGM \times R1) / ((R3+R2) \times (R1+R2) - R2^2) \quad (6)$$

Accordingly, corrected voltage ΔV2 can be obtained by subtracting the expression (3) from the expression (6). That is as below.

$$\Delta V2 = R2 \times (N \times RS1 \times ICHGM \times R1) / ((R3+R2) \times (R1+R2) - R2^2) \quad (7)$$

The corrected voltage ΔV2 corresponds to a voltage value of voltage drop ΔVLSM of the parasitic resistance RLS1 with being divided by the resistance elements R110 and R120 when charging current ICHGM flows. Accordingly, an expression (8) as below can be obtained.

$$\Delta V2 = (R120/(R110+R120)) \times \Delta VLSM \quad (8)$$
$$= (R120/(R110+R120)) \times RLS1 \times ICHGM$$

It is apparent from the expressions (7) and (8) that corrected voltage ΔV2 proportional to charging current ICHGM is added to reference voltage V2, as well as corrected voltage equivalent to voltage drop ΔVLSM of the parasitic resistance RLS1 is added to output voltage VO.

Here, an example of specific numerical values will be sought by using VREF=5V, V2=4.2V, R1=10 kΩ, R2=210 kΩ, and R3=70 kΩ which are obtained by the expression (3), R110/R120=2 obtained by the expression (4), and expressions (7) and (8). It is provided that an equality V3=2V (V3=N×RS1×ICHGM=2) is obtained by appropriately selecting between the charging current detecting resistance RS1 and the predetermined gain (×N) of the amplifier 112 in response to an equality ICHGM=3A. By substituting these numeric values in the expression (7), an answer as below can be obtained.

$$\Delta V2 = 210\ k \times (2 \times 10\ k) / ((70\ k + 210\ k) \times (10\ k + 210\ k) - 210\ k^2)$$
$$= 0.24\ V$$

The above numerical value being substituted in the expression, an equality RLS1=240 mΩ can be obtained, which is derived from ΔV2=(⅓)×RLS1×3=0.24. That is, when charging current is 3 A, parasitic resistance of 240 mΩ is corrected.

Figure 5:
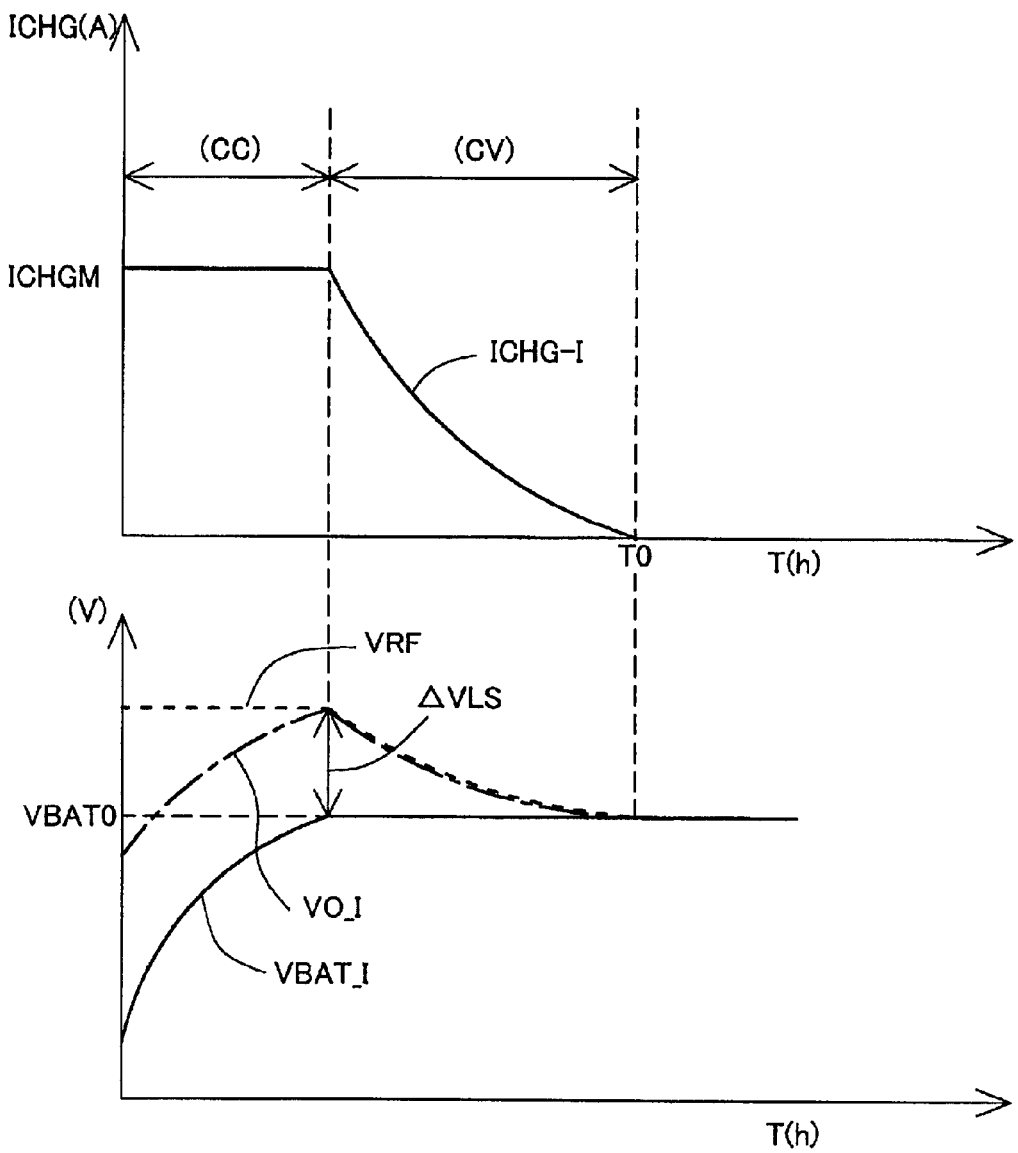
FIG. 5 shows battery charging characteristics directed to first through third embodiments.

FIG. 5 shows charging characteristics of the battery 101. Since the battery 101 is not sufficiently charged during an initial charging period, terminal voltage VBAT at the battery output terminal VBAT is even lower than full charging voltage VBAT0. Accordingly, even if drop voltage ΔVLS which occurs when charging current ICHG flows in the parasitic resistance RLSI is added to the terminal voltage VBAT, output voltage VO at the charging-control-device output terminal VO is also even lower than full charging voltage VBAT0.

Accordingly, a value of voltage inputted to the inversion input terminal VFB of the error amplifier 118 is even lower than reference voltage V2 set for the non-inversion terminal V2. Therefore, an output signal from the error amplifier 118 indicates a maximum value. Furthermore, since the value of charging current ICHG increases from 0 A when charging begins, voltage outputted from the output terminal V3 of the amplifier 112 is lower than reference voltage V1 while in a transitional state. As a result, an output signal from the error amplifier 116 indicates a maximum value. This means both two switching duties in response to output signals from the error amplifiers 116 and 118 are set to maximum duties.

Due to a maximum duty controlled by an output from the error amplifier 116, charging current ICHG as well as detection voltage V3 increase at the same time. At a point where detection voltage V3 exceeds reference voltage V1, a type of an input signal coming into the error amplifier 116 is reversed. Therefore, an output signal from the error amplifier 116 shifts to low voltage side. In the comparator 120, there are inputted output signals from the error amplifiers 116 and 118 through its non-inversion input terminals. Out of the two output signals, a comparative output with respect to the signal with lower voltage level can be obtained. Therefore, when voltage level of an output signal from the error amplifier 116 lowers that from the error amplifier 118, duty control is conducted in accordance with the output signal from the error amplifier 116. Accordingly, by appropriately setting values of the charging current detecting resistance RS1, the predetermined gain (×N) of the amplifier 112 and reference voltage V1, constant current charging control is conducted with a predetermined charging current ICHGM ((CC) region in FIG. 5).

Through detection voltage V3 and resistance element R3, the value of the reference voltage V2 at this point comes to a sum of an original value of the reference voltage V2 and that of corrected voltage. In FIG. 5, this voltage value is indicated as control voltage VRF at the charging-control-device output terminal VO. Furthermore, voltage drop ΔVLSM which occurs when charging current ICHGM flows in the parasitic resistance RLS1 works as corrected voltage, thereby to set reference voltage VRF. FIG. 5 also shows output voltage VO_I at the charging-control-device output terminal VO as well as battery voltage VBAT_I. Since charging is conducted with charging current ICHGM, a value of the output voltage VO_I is larger than that of the battery voltage VBAT_I by drop voltage ΔVLSM which occurs at the parasitic resistance RLS1.

As charging to the battery 101 goes further and a value of battery voltage VBAT_I becomes large, a value of output voltage VO_I including drop voltage ΔVLSM at the parasitic resistance RLS1 there also becomes large. Since the charging control circuit 111 controls the charging-control-device output terminal VO in a manner of feedback, voltage at the input terminal of the error amplifier 118 is inverted and output voltage from there lowers at a point where output voltage VO_I exceeds control voltage VRF. When a value of the lowering voltage lowers output voltage from the error amplifier 116, the comparator 120 outputs a comparative result between an output signal from the error amplifier 118 and an oscillating signal from the oscillator (OSC) 122. That is, duty control is conducted in accordance with an output signal from the error amplifier 118, whereby constant voltage charging control is conducted with voltage VBAT0 of a full charging period ((CV) region in FIG. 5). During this full charging period, a value of battery voltage VBAT approximates full charging voltage VBAT0. A value of charging current ICHG decreases and lowers charging current ICHGM of a constant charging period, however, charging to the battery 101 continues and finishes at a point where charging current ICHG runs out (time t0 in FIG. 5).

As an example of specific structure with respect to an output voltage control section directed to claim 1, there are arranged the error amplifier 118, the comparator 120, and the inversion output buffer 124. Furthermore, the charging current detecting resistance RS1 and the amplifier 112 correspond to an example of a specific structure of an output current detecting section directed to claim 1 as well as a specific example of a current-voltage converter directed to claim 3. Furthermore, the resistance elements R1 through R3 correspond to a specific example of a reference voltage correcting section directed to claim 1, that of a base reference voltage section directed to claim 10, and that of a first voltage dividing section directed to claim 11. Furthermore, the resistance elements R3 and R2 correspond to a specific example of a correcting voltage section directed to claim 10 as well as that of a second voltage dividing section directed to claim 12. In this case, reference voltage VREF corresponds to a specific example of a constant power source directed to claim 11. It should be noted that the output current control section directed to claim 2 is constituted by the amplifier 112, the error amplifier 116, the comparator 120 and the inversion output buffer 124.

According to the charging control device 1 directed to the first embodiment, charging current ICHG flow through the parasitic resistance RLS1 as a parasitic load element which exists in its current path. Therefore, even if there occurs a difference of voltage values between the output voltage VO of the charging-control-device output terminal VO and the battery terminal voltage VBAT, wherein potential values of these voltages should be equal essentially, the resistance elements R1 through R3 control the reference voltage V2 depending on a value of charging current ICHG. Thereby, control voltage for the output voltage VO can be adjusted appropriately. Even if there is a distance between a position of the charging-control-device output terminal VO a voltage value of which is controlled by the error amplifier 118, the comparator 120 and the inversion output buffer 124 depending on a value of reference voltage V2 and that of the battery output terminal VBAT, on the charging current path, the voltage value of the battery terminal voltage VBAT can be charged up to desired output voltage VBAT0.

To be more specific, since the charging-control-device output terminal VO is located at upstream side for the battery output terminal VBAT, a value of the reference voltage V2 is set high by adding correction voltage in response to voltage drop $\Delta$VLS which has occurred between the distance. Thereby, the battery output terminal VBAT can be charged up to a desired value of output voltage VBAT0. In case an amount of the charging current ICHG is large, the reference voltage V2 is set high whereas in case it is a little, the reference voltage V2 is set low. Consequently, even if voltage drop $\Delta$VLS occurs between the charging-control-device output terminal VO and the battery output terminal VBAT when charging current ICHG, control voltage at the battery output terminal VBAT is kept at full charging voltage VBAT0, whereby control voltage at the output voltage VO can be adjusted appropriately.

A detection result with respect to charging current ICHG can be obtained as detection voltage V3. Therefore, the reference voltage V2 can be corrected by connecting to the resistance element R3.

Furthermore, base reference voltage may be a divided voltage of reference power source VREF which is divided by the resistance element R1 and the parallel resistances consisting of the resistance elements R2 and R3. Thereby, full charging voltage VBAT0 when charging current ICHG does not flow can be adjusted accurately and correction value of reference voltage V2 obtained when charging current ICHG flows can be added with detection voltage V3 divided by the resistance elements R3 and R2. Thereby, reference voltage V2 can be controlled depending on a value of charging current ICHG in an entire region of charging current ICHG including a state of no charging current ICHG.

In the charging control device 1, constant current charging control is conducted during an initial charging period and constant voltage charging control is conducted during late charging period. Thereby, depending on a value of charging current ICHGM during constant current charging control, the reference voltage V2 during constant voltage charging control can be set higher than the reference voltage VFB0 of full charging period when a voltage value of the battery 101 is charged up to full charging voltage VBAT0. Thereby, charging to the battery 101 goes further and output voltage VBAT at the battery 101 when constant current charging control is shifted to constant voltage charging control can approximate a value of full charging condition. Furthermore, a constant current charging period in the entirety of a charging period is made longer. As a result, the entirety of charging time for the battery 101 can be shortened.

Figure 6:
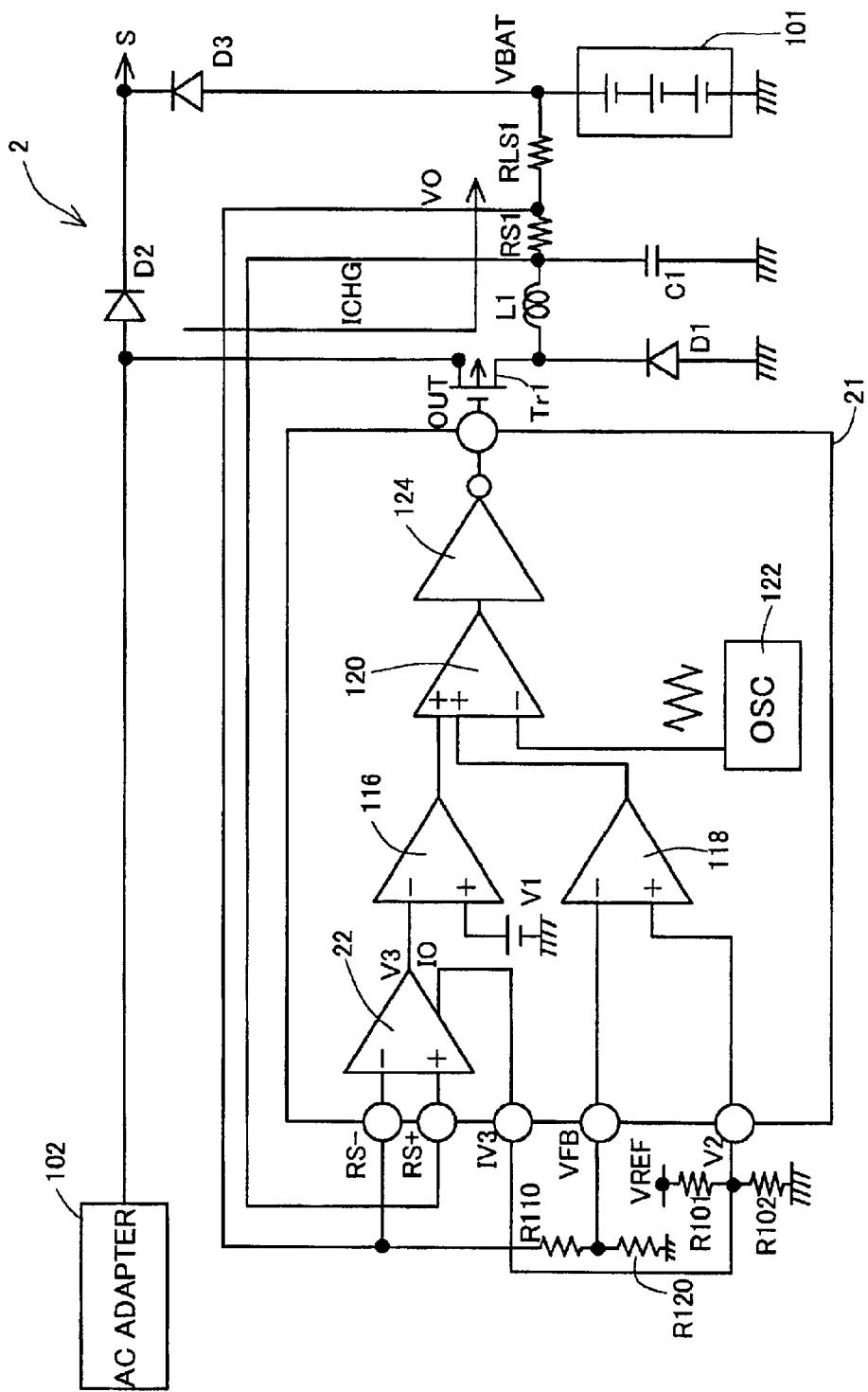
FIG. 6 shows a circuit block of a regulator circuit (charging control device) directed to a second embodiment.

Next, a charging control device 2 directed to a second embodiment will be described by referring to FIG. 6. The charging control device 2 has an amplifier 22 including a detection current terminal IO as its output terminal, instead of the amplifier 112 for the charging control circuit 111 of the charging control device 1 directed to the first embodiment. Furthermore, instead of the structure such that detection voltage V3 outputted from the amplifier 112 is connected to the reference voltage terminal V2 through the resistance element R3, there is applied a structure such that the detection current terminal IO is connected to the reference voltage terminal V2 directly to the charging control device 2. It should be noted that divided voltage of resistances which generate reference voltage V2 (=VFB0) when charging current ICHG does not flow can be constituted by resistance elements R101 and R102 which divide a voltage value of reference power source VREF. These resistance elements correspond to voltage-dividing resistance similar to the resistance elements of the related art.

Figure 7:
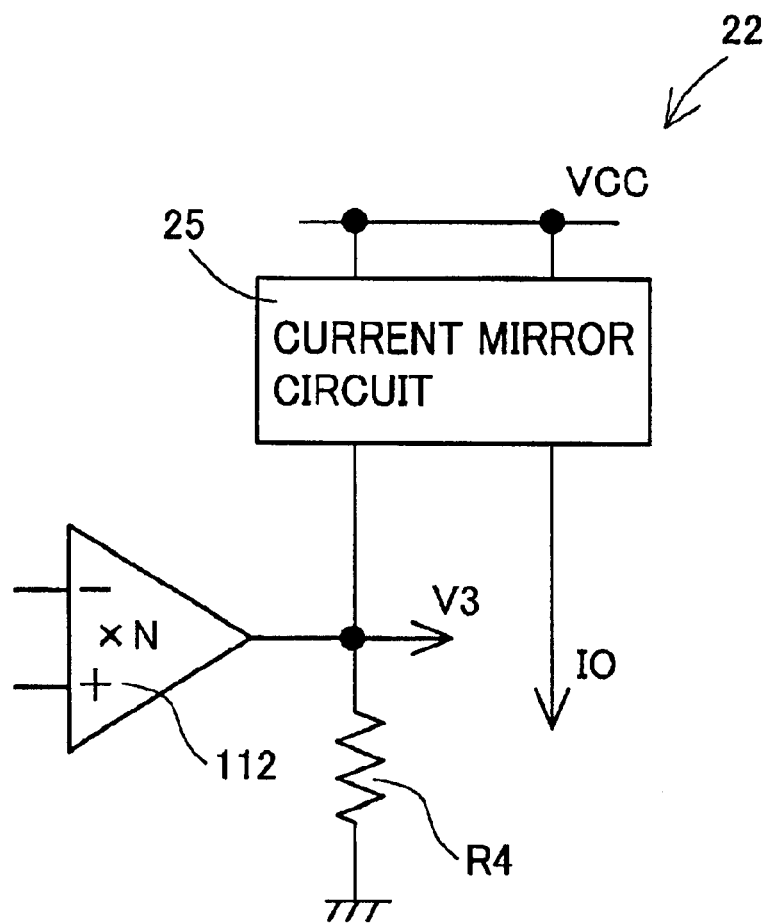
FIG. 7 shows a circuit block of an amplifier directed to the second embodiment.

As shown in FIG. 7, the amplifier 22 has a resistance element R4 for voltage-current conversion between output terminal V3 of the amplifier 112 and ground potential. Current converted by the resistance element R4 turns back at a current mirror circuit 25 to obtain detection current IO from a detection current terminal IO.

Since the amplifier 22 is structured such that detection voltage V3 is applied to both ends of the resistance element R4 so as to obtain detection current IO, the detection current obtained there has proportional relationship with detection voltage V3. A comparative coefficient corresponds to a resistance value R4 of the resistance element R4. Accordingly, provided that a current ratio at the current mirror circuit 25 is 1 to 1, derived from the expression (1), an expression as below can be obtained.

$$IO=V3/R4=N \times RS1 \times ICHG/R4 \qquad (9)$$

Being inputted to the reference voltage terminal V2, the detection voltage IO flows into the resistance element R102. Thereby, a value of the reference voltage V2 is corrected. Charging current ICHG characteristics of the reference voltage V2 at this stage is similar to the characteristics of the first embodiment as shown in FIG. 4. Therefore, the value of the reference voltage V2 can be solved by applying the Kirchhoff's law, similar to the case of the first embodiment.

$$V2=R102 \times (IO \times R101+VREF)/(R101+R102) \qquad (10)$$

By substituting the expression (9) in the expression (10), an expression as below can be obtained, which corresponds to a value of the reference voltage V2 proportional to charging current ICHG.

$$V2 = R102 \times ((N \times RS1 \times ICHG/R4) \times R101 + VREF)/(R101+R102) \quad (11)$$

In case charging current ICHG does not flow, the detection voltage IO is 0A. Accordingly, an expression (12) as below can be obtained.

$$V2 = R102 \times VREF/(R101+R102) \quad (12)$$

That is, the reference voltage V2 is equivalent to voltage obtained where voltage VREF is divided between the resistance elements R101 and R102 in a meaning of electrical potential. This relationship is the same as the expression directed to the related art.

In case charging current ICHG flows, corrected voltage $\Delta$V2 can be obtained by subtracting the expression (12) from the expression (10). That is, an expression (13) as below can be obtained.

$$\Delta V2 = R102 \times (IO \times R101)/(R101+R102) \quad (13)$$

Here, detection current IO will be calculated based on specific numerical values which are similar to those of the charging control device 1 directed to the first embodiment. Provided that $\Delta$V2=0.24V, R101=R1=10 k$\Omega$, and R102= R2//R3=210 k//70 k=52.5 k$\Omega$, there can be obtained a value as below.

$$\begin{aligned} IO &= \Delta V2 \times (R101+R102)/(R101 \times R102) \\ &= 0.24 \times (10\,k + 52.5\,k)/(10\,k \times 52.5\,k) \\ &= 28.6\,\mu A \end{aligned}$$

In the charging control device 2, as to structural elements identical to those of the charging control devices 1 and 100, same numerals are assigned to them. As an example of specific structure with respect to an output current detecting section directed to claim 1, there are arranged the charging current detecting resistance RS1 and the amplifier 22. Furthermore, the amplifier 22 corresponds to an example of a specific structure of an output current detecting section having a current outputting section directed to claim 5. Furthermore, the resistance elements R101 and R102 correspond to an example of a specific structure of a reference voltage correcting section directed to claim 1 as well as specific example of a base reference voltage section directed to claim 10 and a first voltage dividing section directed to claim 11. Still further, on condition that detection current IO flows from the detection current terminal IO of the amplifier 22, the resistance element R102 corresponds to an example of a specific structure of a correcting voltage section directed to claim 10. It should be noted that the output current control section directed to claim 2 is constituted by the amplifier 22, the error amplifier 116, the comparator 120, and the inversion output buffer 124.

According to the charging control device 2 directed to the second embodiment, a detection result of charging current ICHG can be obtained as detection current IO. Therefore, reference voltage V2 can be corrected when detection current IO is allowed to flow in the resistance element R102, out of the resistance elements R101 and R102 both of which are to divide voltage of reference power source VREF. Other than the voltage dividing resistance elements R101 and R102 both of which are to generate reference voltage VFB0 in case of no charging current ICHG, there is no need to add structural elements such as another resistance element and the like for correcting a value of reference voltage V2. This is a convenient point of the second embodiment.

Other effects of the second embodiment are same as the charging control device 1. That is, when amount of charging current ICHG is much, reference voltage V2 is set high, whereas when it is a little, reference voltage V2 is set low. Thereby, control voltage of output voltage VO can be adjusted appropriately with control voltage at the battery output terminal VBAT being kept at full charging voltage VBAT0 even if voltage drop $\Delta$VLS occurs between the charging-control-device output terminal VO and the battery output terminal VBAT when charging current ICHG flows there. Accordingly, in case the charging control device 2 is used for charging to the battery 101, when charging to the battery 101 goes on and control manner is switched from constant current charging control to constant voltage charging control, output voltage VBAT at the battery 101 can be allowed to approximate a value of predetermined voltage VBAT0 obtained in a full charging condition. Consequently, a constant current charging period in the entirety of a charging period is made longer and the entirety of charging time for the battery 101 can be shortened, accordingly.

Figure 8:
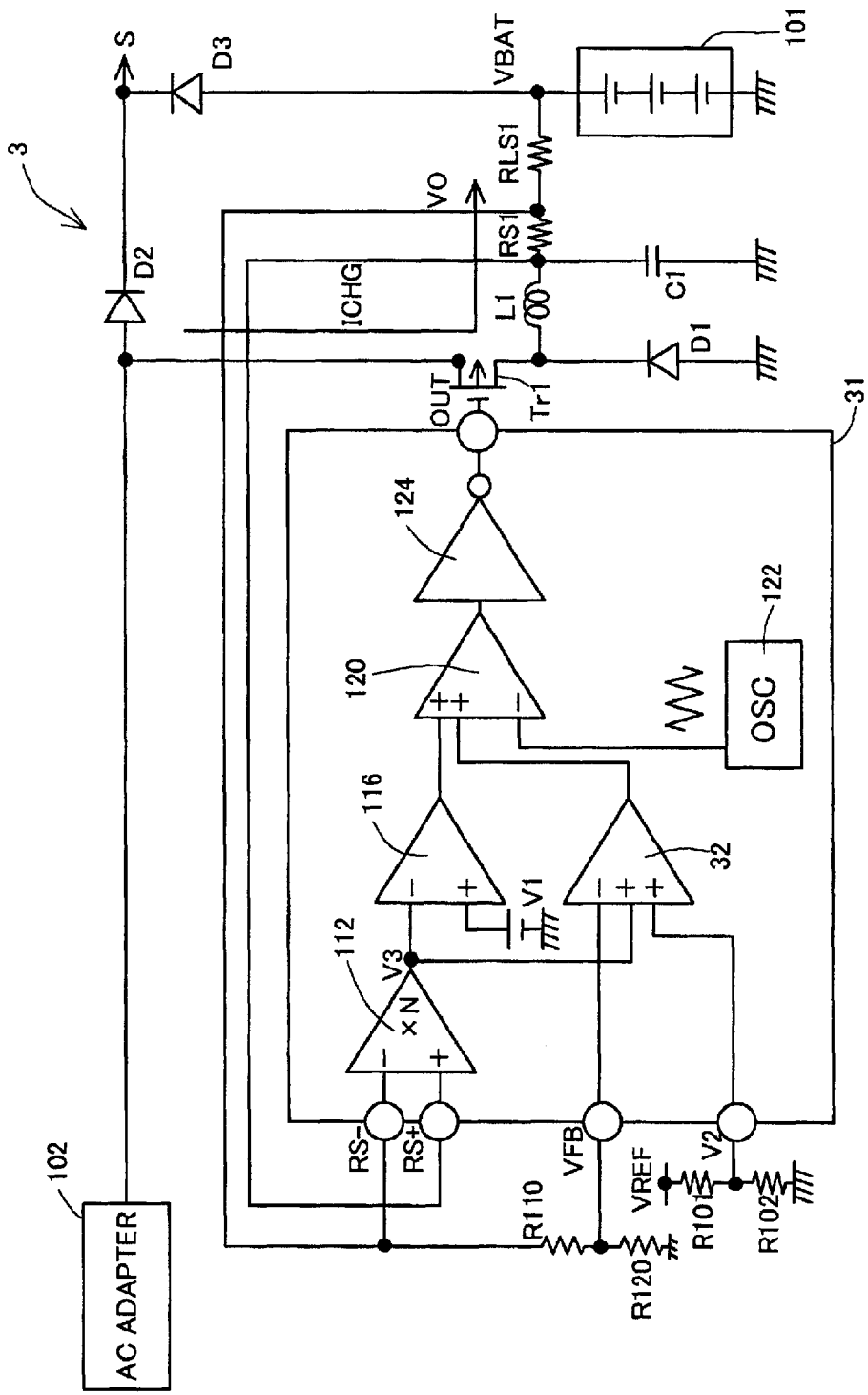
FIG. 8 shows a circuit block of a regulator circuit (charging control device) directed to a third embodiment.

Next, a charging control device directed to a third embodiment will be described by referring to FIG. 8. In the charging control device 3, the charging control circuit 31 has an inversion input terminal VFB to which output voltage VO (voltage divided) at charging-control-device output terminal VO is inputted and an error amplifier 32 which has two non-inversion input terminals connected to an output terminal V3 of the amplifier 112 and a reference voltage terminal V2, instead of the structure such that the output terminal V3 of the amplifier 112 in the charging control circuit 111 directed to the first embodiment is connected to the reference voltage terminal V2 through the resistance element R3.

Although details of it is not shown in a drawing, the error amplifier 32 amplifies either an error between voltage VFB and detection voltage V3 or an error between voltage VFB and reference voltage V2 depending on a value of voltage VFB obtained where output voltage VO is divided between resistance elements R110 and R120 in a meaning of electrical potential, whereby output voltage VO is controlled and adjusted to an appropriate voltage value depending on a value of either detection voltage V3 or reference voltage V2 set at the two non-inversion input terminal.

Figure 9:
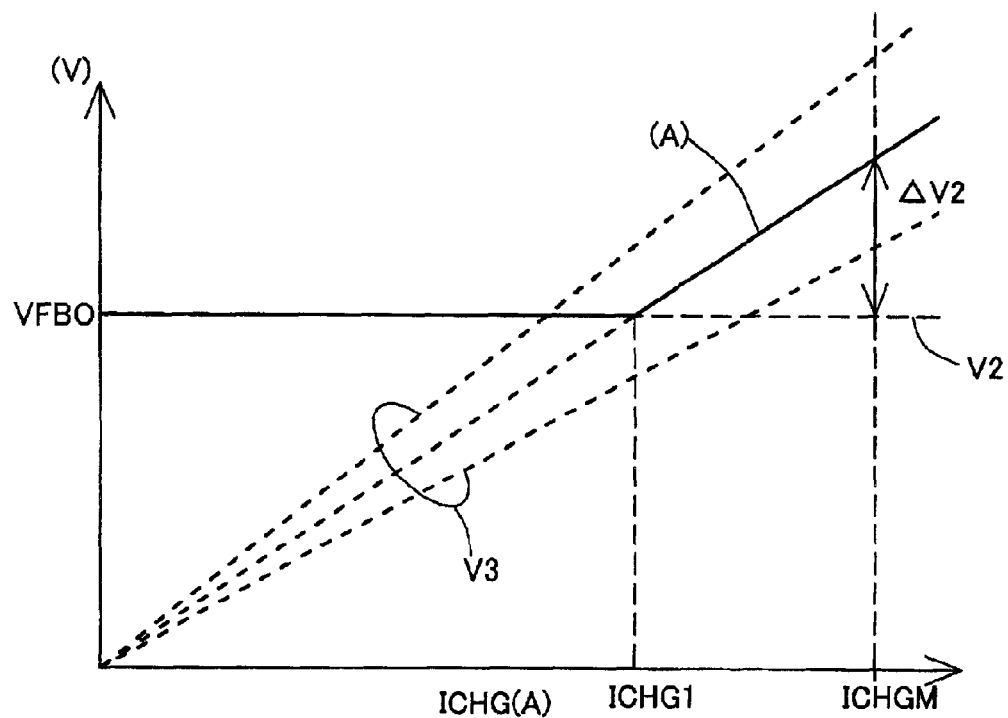
FIG. 9 shows charging current characteristics with respect to reference voltage of the third embodiment.

FIG. 9 shows charging characteristics of reference voltage directed to the third embodiment. The control system of FIG. 9 indicates that out of two voltages set in the two non-inversion terminals, it is controlled to be the lower voltage level in the error amplifier 32. Constant voltage VFB0 obtained where reference power source VREF is divided between the resistance elements R101 and R102 in a meaning of electrical potential is inputted to the reference voltage terminal V2. On the other hand, detection voltage V3 is inputted to the output terminal V3 of the amplifier 112. As indicated with the expression (1), a value of detection voltage V3 is proportional to that of charging current ICHG and has characteristics of having a proper gradient depending on the charging current detecting resistance RS1 and a predetermined gain ($\times$N). Accordingly, as a value of charging current ICHG increases, a value of detection voltage V3 increases. At a point where the charging current ICHG reaches predetermined charging current ICHG1, the detection voltage V3 exceeds reference voltage VFB0. Voltage VFB should be combined with detection voltage V3 such that corrected voltage of reference voltage V2 is adjusted to be $\Delta$V2 in response to charging current ICHGM to be charged in the battery 101 during constant current charging control period. Thereby, as for reference voltage characteristics, the error amplifier 32 can obtain a characteristic (A) shown in FIG. 9. Consequently, during constant charging control period, by adding corrected voltage $\Delta$V2 to reference voltage V2 (=VFB0) for output voltage VO of full charging period, influences of voltage drop ΔVLSM due to the parasitic resistance RLS1 on a charging current path can be eliminated. At the same time, by allowing reference voltage V2 to drop in response to lowering of charging current ICHG from charging current ICHGM during the constant voltage charging control period, the reference voltage V2 can be set to reference voltage VFB0 in a full charging condition when charging current is at a value of charging current ICHG1 or lower.

In the charging control device 3, as to structural elements identical to those of the charging control devices 1, 2, and 100, same numerals are assigned to them. As an example of specific structure with respect to an output voltage control section directed to claim 1, there are arranged the error amplifier 32, the comparator 120, the inversion output buffer 124 in the charging control device 3. Furthermore, the error amplifier 32 corresponds to an example of a specific structure of an output voltage control section directed to claim 14. It should be noted that the resistance elements R101 and R102 correspond to an example of a specific structure of a base reference voltage section directed to claim 14.

According to charging control device 3 directed to the third embodiment, reference voltage VFB0 obtained when charging current ICHG does not flow and reference voltage corrected when charging current ICHG flow can be set separately so that the two reference voltages can be simply adjusted for sure. In this situation, detection voltage V3 of the status quo outputted from the amplifier 112 can be used as corrected reference voltage, which is convenient.

Other effects of the third embodiment are same as the charging control devices 1 and 2. That is, when charging current ICHG is much, reference voltage V3 is set high, whereas when charging current ICHG is a little, reference voltage V3 is set low. Thereby, control voltage of output voltage VO can be adjusted appropriately with control voltage at the battery output terminal VBAT being kept at full charging voltage VBAT0 even if voltage drop ΔVLS occurs between the charging-control-device output terminal VO and the battery output terminal VO when charging current ICHG flows there. Accordingly, in case the charging control device 3 is used for charging to the battery 101, when charging to the battery 101 goes on and control manner is switched from constant current charging control to constant voltage charging control, output voltage VBAT at the battery 101 can be allowed to approximate a value of predetermined voltage VBAT0 obtained during a full charging condition. Consequently, a constant current charging period in the entirety of a charging period is made longer and the entirety of charging time for the battery 101 can be shortened, accordingly.

Figure 10:
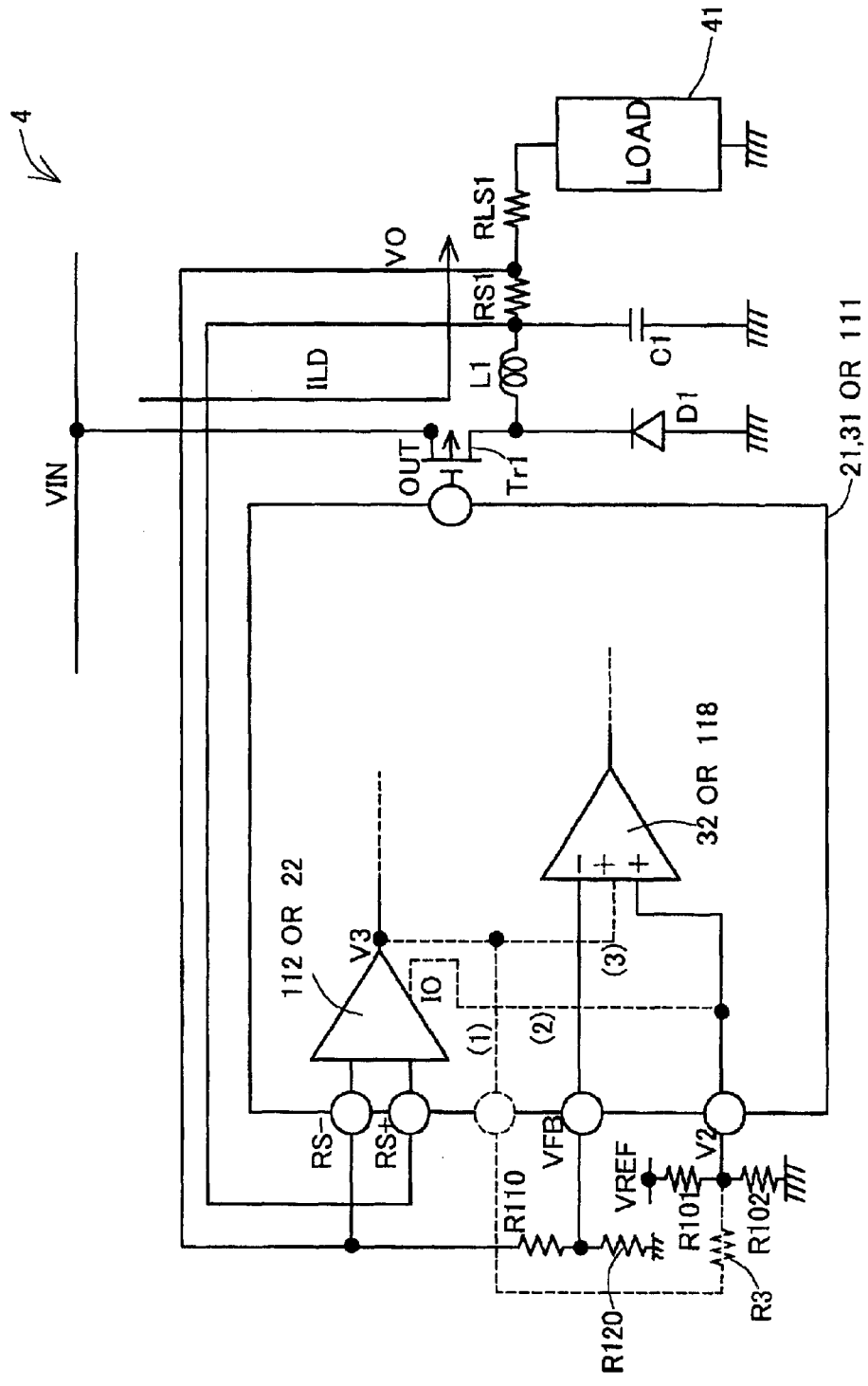
FIG. 10 shows a circuit block of a regulator circuit (switching regulator) directed to a fourth embodiment.

A fourth embodiment shown in FIG. 10 describes a case that the regulator circuit of the present invention is put into practice as a switching regulator 4. In the switching regulator 4, a load 41 is used instead of the battery 101 for the charging control devices 1 through 3 directed to the first through third embodiments. Other than a point that an output current control section constituted by an amplifier 112 or 22, an error amplifier 116, a comparator 120, and an inversion output buffer 124 is used for controlling restriction of load current during an overloaded period, functions and effects essentially same as the first through third embodiments can be obtained in the fourth embodiment. It should be noted that (1) through (3) indicated with broken lines in FIG. 10 correspond to structures of the first through third embodiments, respectively. That is, any structures of the first through third embodiments can be applied to the fourth embodiment as its circuit structure.

Figure 11:
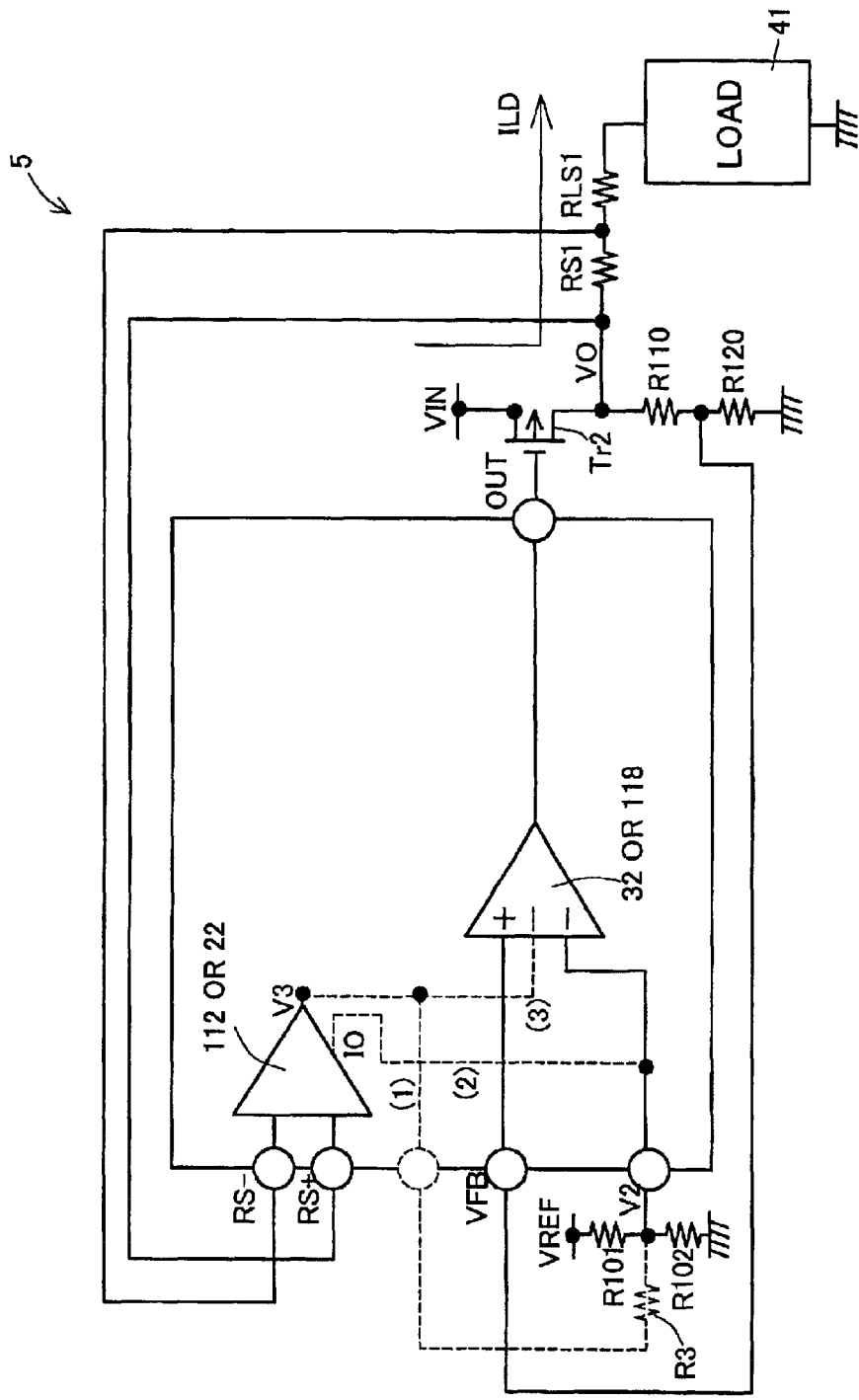
FIG. 11 shows a circuit block of a regulator circuit (series regulator) directed to a fifth embodiment.

A fifth embodiment shown in FIG. 11 indicates a case that a regulator circuit of the present invention is put into practice as a series regulator 5. In the series regulator 5, a load 41 is used instead of the battery 101 for the charging control devices 1 through 3 directed to the first through third embodiments. Power source supply to the load 41 is carried out by applying linear control to a PMOS driver Tr2. A current detecting resistance RS1, a parasitic resistance RLS1, and resistance elements R110 and R120 in this embodiment work similar to the first through fourth embodiments. In the series regulator 5 directed to the fifth embodiment, output voltage from an error amplifier 118 controls gate voltage of the PMOS driver Tr2. It should be noted that input signals to inversion/non-inversion input terminals of error amplifiers 32 or 118 are quite the reverse of the first through fourth embodiments. Furthermore, an amplifier 112 is used to correct a value of reference voltage V2 depending on a value of load current. It should be noted that (1) through (3) indicated with broken lines in FIG. 11 correspond to structures of the first through third embodiments, respectively. That is, any structures of the first through third embodiments can be applied to the fifth embodiment as its circuit structure.

In the switching regulator 4 and the series regulator 5, constant voltage control of output voltage VO is carried out by the error amplifier 32 or 118 and the like. Thereby, depending on a value of load current ILD, reference voltage under constant voltage control can be set higher reference voltage of an unloaded condition when predetermined voltage is supplied to load terminal voltage VLD at the load terminal VLD of the load 41. Thereby, even if voltage drop ΔVLS at a current path becomes large within a large load current region reachable of an overloaded state, the load 41 applies predetermined voltage to the load terminal VLD. Consequently, predetermined voltage can be applied to any points of the load current region accurately.

A comparative coefficient of either detection voltage V3 or detection current IO responsive to charging current ICHG or load current ILD may be set adjustable externally so that detection voltage V3 or detection current IO responsive to charging current ICHG or load current ILD can be adjusted easily. Even if wiring resistances differ due to connectors, contact resistances, wirings or the like with respect to each of the specific structures such as the charging control circuits 1 though 3, switching regulator 4, and series regulator 5, whereby current path characteristics diversify, detection voltage V3 or detection current IO responsive to charging current ICHG or load current ILD can be adjusted easily.

Figure 12:
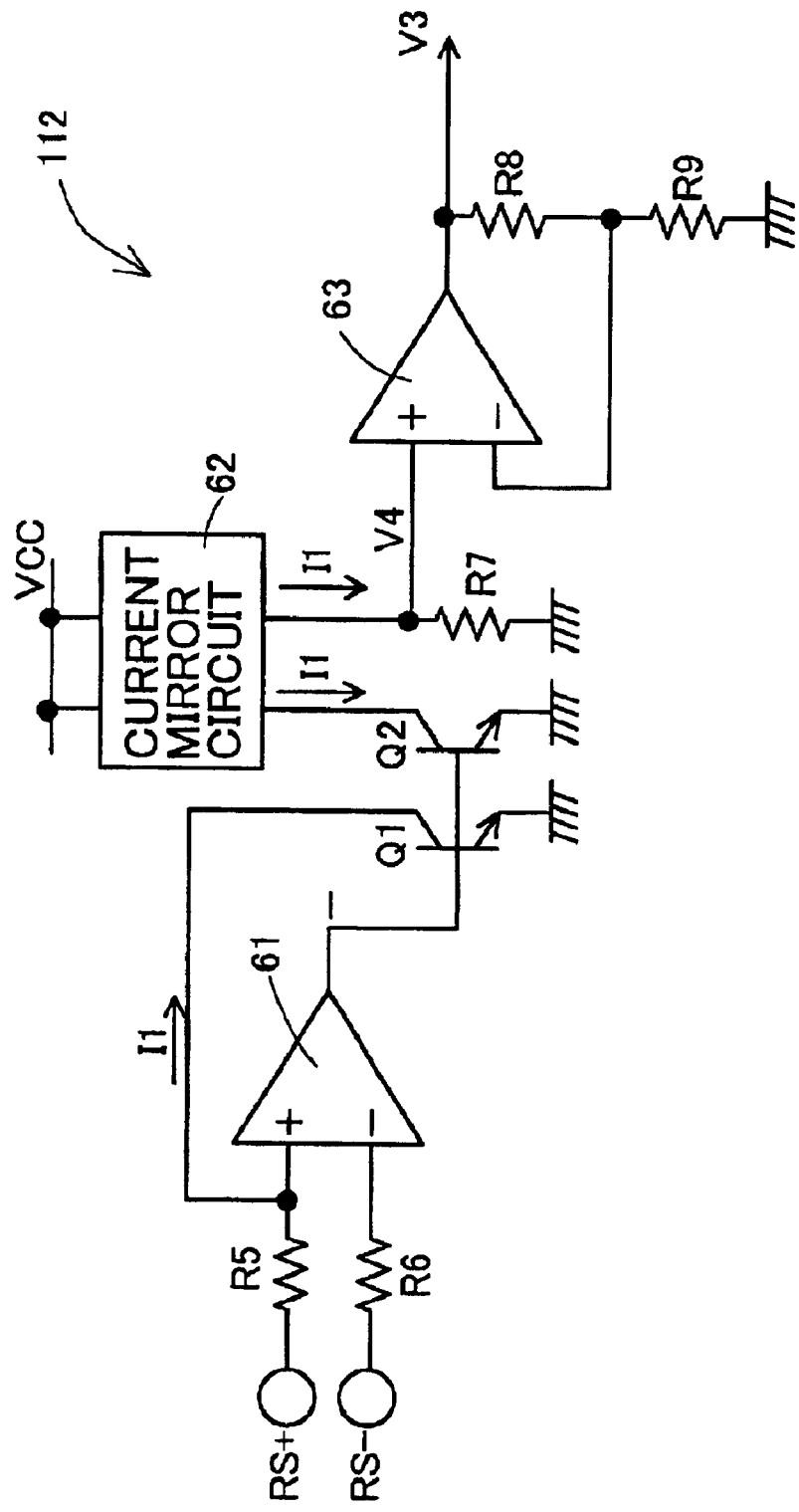
FIG. 12 is a circuit diagram showing a specific example of an amplifier.
Figure 13:
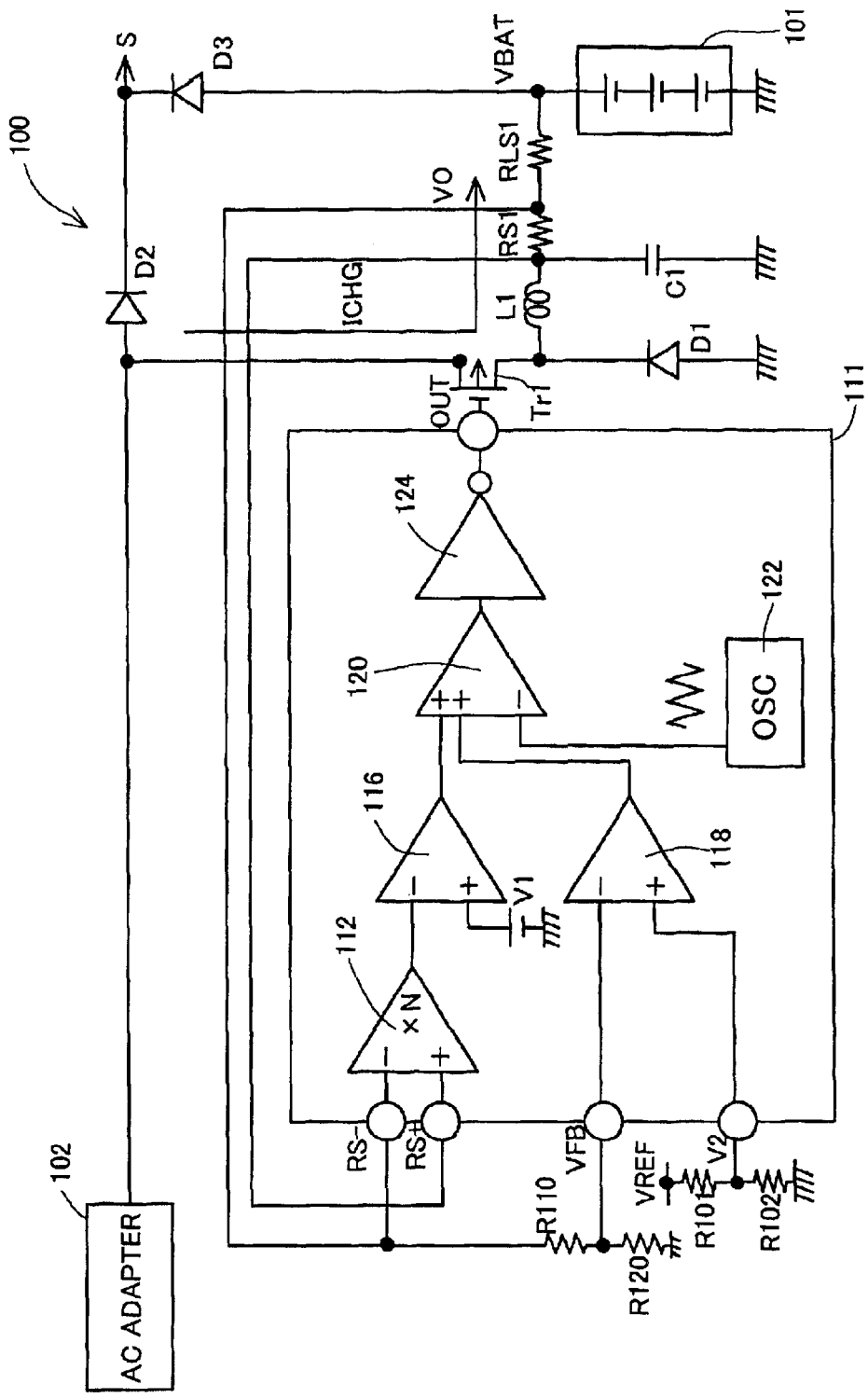
FIG. 13 shows a circuit block of a regulator circuit (charging control device) directed to related art.
Figure 14:
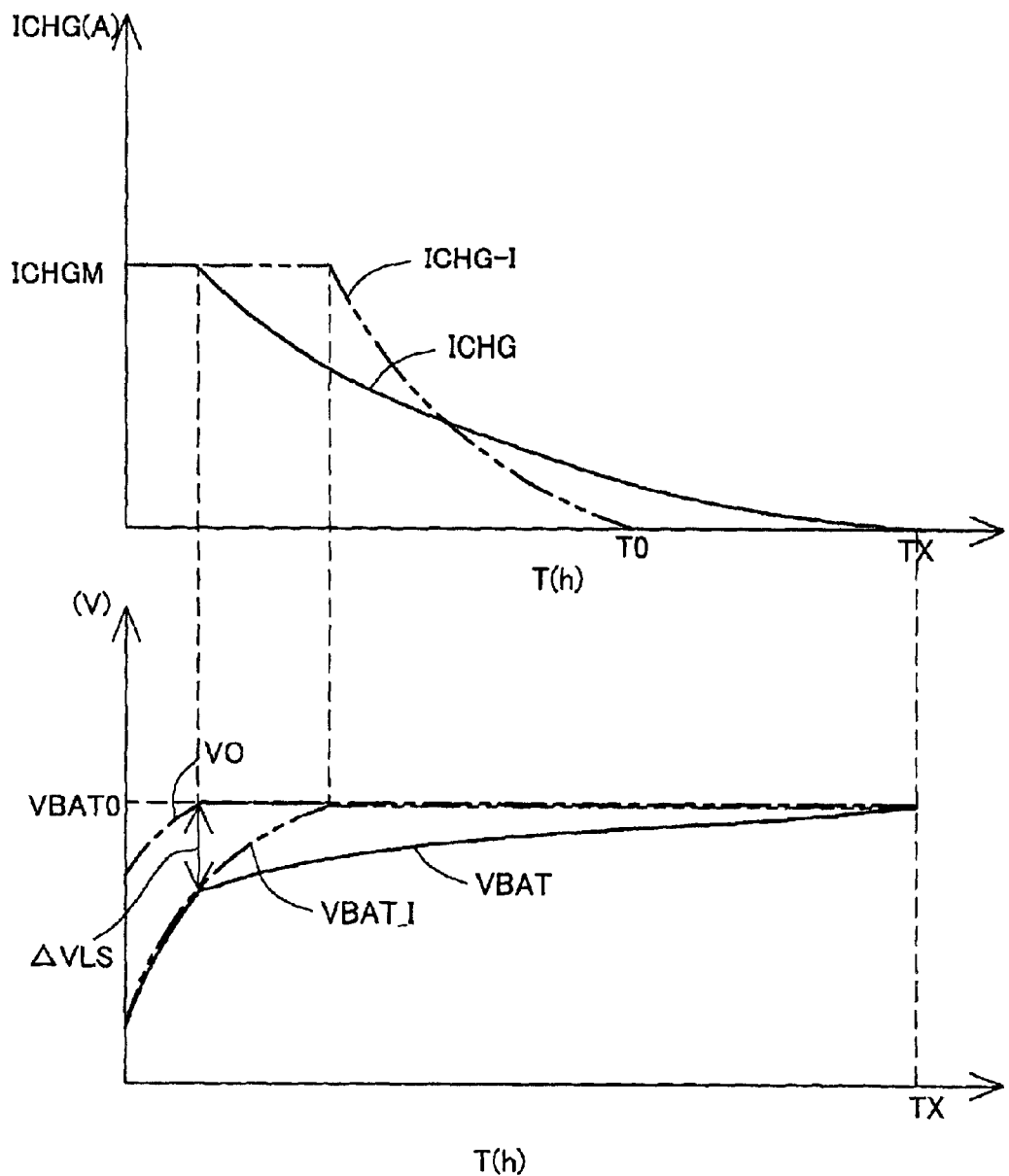
FIG. 14 shows battery charging characteristics directed to related art.

FIG. 12 shows a specific example of the amplifier 112 used in the first through third embodiments. Output current detecting terminals RS– and RS+ are connected to resistance elements R6 and R5, respectively. The resistance elements R6 and R5 are further connected to an inversion input terminal and a non-inversion input terminal of an amplifier 61, respectively. An output terminal of the amplifier 61 is connected to transistors Q1 and Q2 in common. A collector terminal of the transistor Q1 is connected to the non-inversion input terminal of the amplifier 61 and a collector terminal of the transistor Q2 is connected to a current mirror circuit 62. Emitter terminals of the transistors Q1 and Q2 are connected to ground potential. A mirror current outputting terminal of the current mirror circuit 62 is connected to a resistance element R7 another terminal of which is connected to ground potential. A voltage converting terminal V4 is constituted between the mirror current outputting terminal and the resistance element R7. The voltage converting terminal V4 is connected to a non-inversion amplifier circuit constituted by the amplifier 63 and resistance elements R8 and R9. An output terminal of the non-inversion amplifier circuit corresponds to an output terminal V3.

In accordance with an imaginary short characteristic which is an operational characteristic of an operational amplifier, the amplifier 61 is controlled such that input voltage to its non-inversion input terminal and input voltage to its inversion input terminal are approximately equal. Accordingly, current I1 is allowed to flow from the output current detecting terminal RS+ through the resistance element R5 by the transistor Q1 biased with output current from the amplifier 61. Voltage drop at the resistance element R5 is controlled to be almost the same as voltage drop ΔVLS which occurs at the charging current detecting resistance RS1 when charging current ICHG flows. Since output current from the amplifier 61 is inputted to the base terminal of the transistor Q2 at the same time, a value of collector current at the transistor Q2 is approximately same as current I1. Provided that a mirror current ratio at the current mirror circuit is I1:I1=1:1, current mirrored at the current mirror circuit is approximately same as I1. When this current I1 flows through the resistance element R7, voltage V4 can be obtained. By appropriately amplifying the voltage V4 thus obtained at the non-inversion amplifier circuit, there can be obtained detection voltage V3 having a desirable predetermined gain (×N).

The above-described operations can be described with an expression as below.

$$I1 = \Delta VLS / R5 \quad (14)$$

$$V4 = R7 \times I1$$

$$= R7 \times \Delta VLS / R5$$

$$V3 = ((R8 + R9) / R9) \times V4$$

$$= ((R8 + R9) / R9) \times R7 \times \Delta VLS / R5$$

Accordingly, the predetermined gain (×N) of the amplifier 112 can be adjusted by changing or adjusting at least one of the resistance values, namely, a resistance value of the resistance element R7 or that of the resistance elements R8 and R9.

Furthermore, with respect to the amplifier 22 used in the second embodiment, its predetermined gain (×N) can be adjusted by changing or adjusting a resistance value of the resistance element R4 as shown in FIG. 7. Furthermore, instead of the structure shown in FIG. 7, a structure shown in FIG. 12 can be applied to the amplifier 22, wherein an output from the current mirror circuit 62 is set as detection current IO.

The present invention is not limited to the above-described first through fourth embodiments, but obviously various improvements and modifications are possible within a scope not deviating from the essentials of the invention.

For example, the forgoing embodiments describe cases such that a charging-control-device output terminal VO is arranged up-stream side on a current path where charging current ICHG or load current ILD flows, compared with the battery output terminal VBAT or the load terminal VLD. However, a regulator circuit of the present invention is not limited to the structure such as the above. Even if the charging-control-device output terminal VO is arranged down-stream side on a current path, this structure is applicable to a regulator circuit of the present invention. In this case, drop voltage ΔVLS at the parasitic resistance RLS1 may be subtracted from a value of control voltage for output voltage VO in response to control voltage at the battery output terminal VBAT or at the load terminal VLD.

The third embodiment describes a case that reference voltage is constituted by constant voltage VFB0 and detection voltage V3 having a predetermined gradient, as an example. However, aspects of a regulator circuit of the present invention are not limited to the above case. For example, reference voltage may be constituted by two or more lines each of which has different gradient characteristics, in addition to these lines as shown in FIG. 9 or instead of them.

Furthermore, adjustment of predetermined gain (×N) at the amplifier 112 is not limited to the circuit structure as shown in FIG. 12. The circuit may be structured with various amplifier circuit such as differential amplifier circuit, non-inversion amplifier circuit or the like or structured by combining these amplifier circuits appropriately.

According to the present invention, there can be provided a regulator circuit capable of accurately adjusting output voltage anywhere in a current region and maintaining optimum output voltage by correcting setting of predetermined voltage to be regulated depending on a value of charging current.

What is claimed is:

1. A regulator circuit comprising:
   an output voltage control section for controlling an output voltage based on a reference voltage;
   an output current detecting section; and
   a reference voltage correcting section for controlling the reference voltage based on an output current detected at the output current detecting section,
   wherein the reference voltage correcting section works to increase the reference voltage as the output current increases.

2. A regulator circuit according to claim 1, further comprising an output current control section for controlling the output current based on a detection result obtained by the output current detecting section.

3. A regulator circuit according to claim 1, wherein the output current detecting section includes a current-voltage converter and controls the reference voltage correcting section based on detecting voltage a value of which depends on a value of the output current.

4. A regulator circuit according to claim 3, wherein the detecting voltage is outputted with a predetermined proportional coefficient with respect to the output current.

5. A regulator circuit according to claim 1, wherein the output current detecting section includes a current outputting section and controls the reference voltage correcting section based on detecting current a value of which depends on a value of the output current.

6. A regulator circuit according to claim 5, wherein the detecting current is outputted with a predetermined proportional coefficient with respect to the output current.

7. A regulator circuit according to claim 4, wherein the proportional coefficient is externally adjustable.

8. A regulator circuit according to claim 6, wherein the proportional coefficient is externally adjustable.

9. A regulator circuit according to claim 1, wherein the reference voltage correcting section changes a value of the reference voltage with positive or negative correlation in response to a value change of the output current.

10. A regulator circuit according to claim 1, wherein the reference voltage correcting section includes:
    a base reference voltage section for outputting base reference voltage in case the output current does not flow; and
    a correcting voltage section for applying correcting voltage changeable depending on a value of the output current over to the base reference voltage.

11. A regulator circuit according to claim 10, wherein the base reference voltage section includes either a constant voltage source or a constant voltage source and a first voltage dividing section, and the base reference voltage is either predetermined voltage outputted from the constant voltage source or voltage corresponding to the predetermined voltage divided by the first voltage dividing section.

12. A regulator circuit according to claim 11, wherein the correcting voltage section includes a second voltage dividing section and divides the detecting voltage.

13. A regulator circuit according to claim 11, wherein correcting voltage section includes the first voltage dividing section and allows the detecting current to flow toward the first voltage dividing section.

14. A regulator circuit according to claim 1, further comprising a base reference voltage section for outputting base reference voltage in case the output current does not flow,
wherein the output voltage control section includes:
a first reference voltage terminal to which the base reference voltage is inputted; and
a second reference voltage terminal to which corrected reference voltage chargeable depending on a value of the output current is inputted, and
either the base reference voltage or the corrected reference voltage is selected, depending on large and small relationship between these two reference voltages, as the reference voltage and output voltage are controlled.

15. A regulator circuit according to claim 14, wherein the output current detecting section includes a current-voltage converter to control the reference voltage correcting section based on detecting voltage a value of which depends on a value of the output current, and the corrected reference voltage is generated based on the value of the detecting voltage.

16. A regulator circuit according to claim 14, wherein the output current detecting section includes a current outputting section to control the reference voltage correcting section based on detecting current a value of which depends on a value of the output current, and the corrected reference voltage is generated based on the value of the detecting current.

17. A regulator circuit according to claim 2, wherein the reference voltage during constant voltage charging control is set higher than the reference voltage of a fully-charged condition depending on a value of charging current for constant current charging control in case a battery is charged up to the output voltage with a manner such that the output current control section conducts the constant current charging control at an initial charging period and the output voltage control section conducts the constant voltage charging control at a late charging period.

18. A regulator circuit according to claim 2, wherein the reference voltage during constant voltage control is set higher than the reference voltage of an unloaded condition depending on a value of load current in case a predetermined voltage is supplied to a load with a manner such that the output current control section conducts current limiting control when overloaded and the output voltage control section conducts the constant voltage control for the output voltage.

19. A regulator circuit controlling method of making reference voltage variable, the reference voltage adjusting output voltage to predetermined voltage and maintaining thereat depending on a value of output current, wherein a value of the reference voltage is changed with positive or negative correlation in response to a value change of the output current.

20. A regulator circuit controlling method of making reference voltage variable, the reference voltage adjusting output voltage to predetermined voltage and maintaining thereat depending on a value of output current, wherein the reference voltage is set higher than the reference voltage of a fully-charged condition depending on a value of charging current for constant current charging control in case a battery is charged with a manner such that constant current charging control is conducted at an initial charging period and constant voltage charging control is conducted at a late charging period.

21. A regulator circuit controlling method of making reference voltage variable, the reference voltage adjusting output voltage to predetermined voltage and maintaining thereat depending on a value of output current, wherein the reference voltage is set higher than the reference voltage of an unloaded condition depending on a value of load current in case the predetermined voltage is supplied to a load.

22. A regulator circuit comprising:
an output voltage control section for controlling output voltage based on a reference voltage;
an output current detecting section; and
a reference voltage correcting section for controlling the reference voltage based on an output current detected at the output current detecting section, wherein the reference voltage correcting section comprises:
a base reference voltage section for outputting a base reference voltage in case the output current does not flow; and
a correcting voltage section for applying a correcting voltage changeable depending on a value of the output current over to the base reference voltage, wherein the reference voltage correcting section works to increase the reference voltage as the output current increases.

* * * * *